(12) United States Patent
Knez et al.

(10) Patent No.: US 10,083,625 B2
(45) Date of Patent: Sep. 25, 2018

(54) DATA PROCESSING SYSTEM AND METHOD FOR PROCESSING TRAINING DATA RELATING TO THE TRAINING OF MOTOR VEHICLE DRIVERS

(71) Applicant: Bayerische Motoren Werke Aktiengesellschaft, Munich (DE)

(72) Inventors: Bernard Knez, Garching (DE); Bernhard Seidl, Eching (DE); Marcel Walden, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 241 days.

(21) Appl. No.: 14/846,596

(22) Filed: Sep. 4, 2015

(65) Prior Publication Data
US 2015/0379893 A1     Dec. 31, 2015

Related U.S. Application Data

(63) Continuation of application No. PCT/EP2014/053904, filed on Feb. 28, 2014.

(30) Foreign Application Priority Data

Mar. 7, 2013  (DE) .................. 10 2013 203 910

(51) Int. Cl.
*G09B 19/16* (2006.01)
*B60K 28/02* (2006.01)
(Continued)

(52) U.S. Cl.
CPC ............ *G09B 19/167* (2013.01); *B60K 28/02* (2013.01); *B60T 7/16* (2013.01); *B60W 30/182* (2013.01); *B60W 2540/28* (2013.01)

(58) Field of Classification Search
CPC ......... G09B 19/167; B60K 28/02; B60T 7/16; B60W 30/182; B60W 2540/28
(Continued)

(56) References Cited

U.S. PATENT DOCUMENTS 3,266,174 A    8/1966  Bechtol et al.
7,565,230 B2   7/2009  Gardner et al.
(Continued)

FOREIGN PATENT DOCUMENTS

DE    601 24 937 T2    9/2007
EP    0 831 444 B1     4/1999
WO    WO 2008/001125 A1  1/2008

OTHER PUBLICATIONS

International Search Report dated Jun. 11, 2014 (Three (3) pages).
(Continued)

*Primary Examiner* — Robert P Bullington
(74) *Attorney, Agent, or Firm* — Crowell & Moring LLP

(57) ABSTRACT

A data processing system for processing driver training data includes a central computer, which is located in a data center, and an administration computer which is arranged in an administration area. The central computer and the administration computer can communicate with each other over data interfaces, and data on the participants in the driver training can be recorded in the administration compute. Recorded participant data can be coupled to participant identification data in a participant identification system, and the participant data coupled to the participant identification data can be transmitted to the central computer. The system may also include an identification means for automatically identifying or selecting a participant, and a network access point located in a training area in which a motor vehicle is located, wherein the network access point can transmit participant data between the central computer and the net- (Continued)

work access point, wherein participant data can also be transmitted by the central computer to a computer located in the motor vehicle.

11 Claims, 3 Drawing Sheets

(51) Int. Cl.
*B60T 7/16* (2006.01)
*B60W 30/182* (2012.01)

(58) Field of Classification Search
USPC .......................................................... 434/65
See application file for complete search history.

(56) References Cited

U.S. PATENT DOCUMENTS

| | | | |
|---|---|---|---|
| 8,370,030 B1 | 2/2013 | Gurin | |
| 2008/0150765 A1* | 6/2008 | Nakajima | G07C 5/008 340/988 |
| 2008/0275604 A1* | 11/2008 | Perry | B60R 25/2018 701/31.5 |
| 2010/0087984 A1 | 4/2010 | Joseph | |
| 2011/0012720 A1 | 1/2011 | Hirschfeld | |

OTHER PUBLICATIONS

German Search Report dated Feb. 24, 2014, with Statement of Relevancy (Five (5) pages).

\* cited by examiner

DATA PROCESSING SYSTEM AND METHOD FOR PROCESSING TRAINING DATA RELATING TO THE TRAINING OF MOTOR VEHICLE DRIVERS

CROSS REFERENCE TO RELATED APPLICATIONS

This application is a continuation of PCT International Application No. PCT/EP2014/053904, filed Feb. 28, 2014, which claims priority under 35 U.S.C. § 119 from German Patent Application No. 10 2013 203 910.7, filed Mar. 7, 2013, the entire disclosures of which are herein expressly incorporated by reference.

BACKGROUND AND SUMMARY OF THE INVENTION

The invention relates to a data processing system and a method for processing data relating to the training of motor vehicle drivers. Such driver training may be carried out, in particular, for educating and training vehicle drivers, in order to enhance their knowledge and skill when driving motor vehicles. To this end, the vehicle drivers are, as a rule, given exercise tasks, in the course of which they are supposed to drive the motor vehicle along a course in a manner as safe as possible under predetermined, difficult conditions such as, for example, a slippery road or tight bends. A trainer or instructor accompanies the training participants through the exercises, instructs them accordingly and evaluates the exercise results together with the participants. Driver training is typically carried out in a specially prepared training area, which is normally, but not necessarily, located away from the public road network.

In order to monitor and evaluate the training performance of the participants it is important for the trainer or instructor to obtain as much information as possible about the respective training trips of the training participants.

From U.S. Pat. No. 3,266,174 A, a test and training simulator for training vehicle drivers is known. It comprises a training station in which a training participant completes his/her training, as well as an instructor station, in which an instructor can monitor and evaluate the actions of the training participant. To this end, actions within the training maneuver are recorded in the training station in the form of signals, and in the case of errors, error data is generated and transferred to the instructor station. A corresponding facility is known from EP 0 831 444 B1.

It is an object of the invention to enable, during vehicle driver training carried out under real conditions in motor vehicles rather than in a simulator, an efficient and secure acquisition, processing and transfer of training data.

This object is achieved by means of the invention as indicated in the independent patent claims. Advantageous embodiments of the invention are indicated in the dependent claims.

According to one embodiment of the invention, a data processing system having a plurality of components is provided to be used for processing training data for a vehicle driver training. A central computer is provided in a data center, which has at least one first network data interface. In an administration area, an administration computer is provided that has at least one second network data interface. The central computer and the administration computer can communicate with each other via the first and second network data interfaces. In the administration computer, participant data about the driver training can be recorded and recorded participant data can be coupled to participant identification data in a participant identification system. The coupled participant data and the participant identification data can be transferred to the central computer. Further, at least one identification means for automatically identifying a participant by means of the participant identification associated with him/her and/or for selecting a participant from a list containing at least some of the recorded participant data is provided. In a training area in which the motor vehicle is driven by the participant, a network access point having at least one third network data interface is provided, via which an at least in part wireless data transfer for transferring at least some of the participant data between the central computer and the network access point is facilitated. The network access point further comprises at least one data transfer interface, via which at least the part of the participant data that was transferred by the central computer can be transferred into a computer located in the motor vehicle.

Training data in terms of the present invention may in particular be the following:
training data, such as the surname or the first name of a participant or an identification permanently associated with the participant,
exercise data representing information about an exercise to be carried out by a participant; this may comprise images and/or text for explaining an exercise, for example an obstacle avoidance exercise,
measurement data that is derived for example from signals from the motor vehicle and describes a vehicle speed, a brake point, a steer angle or the like. Measurement data may also be derived from signals of a sensor located outside of the vehicle and in particular in the training area, for example in respect of lap times or the vehicle speed at a measurement point, and/or
vehicle identification data regarding one or more motor vehicles used during training.

According to one or more embodiments of the invention, in addition to the participation data, further training data, in particular measurement data, may be transferred between the central computer and the network access point. Also, measurement data of sensors located in the vehicle may be transferred back to the central computer.

The invention is based on the realization that for recording, processing and transferring training data during vehicle driver training it is advantageous to subdivide a data processing system substantially into four main components, namely firstly a central computer in which the training data may for example be centrally stored, processed and transferred, secondly an administration computer in which training data and in particular participant data can be recorded, thirdly a network access point provided in the training area, and fourthly a computer located in the motor vehicle, i.e. a mobile computer, which may in particular be implemented as a vehicle-internal access point into a vehicle-external network. At the network access point provided in the training area, it is on the one hand possible to access the data of the central computer advantageously independently from the location or in a decentralized manner, and to temporarily store this data, on the other hand a wireless, stable and rapid connection with a computer located in the motor vehicle can be established. By means of this computer, a man-machine interface (MMI), in particular a graphic user interface (GUI) to the training participant driving the motor vehicle, can be provided, further training data and in particular measurement data can be recorded in the motor vehicle and/or can be represented on the MMI, and/or recorded training data can be transferred between the motor vehicle and the network access point.

According to the invention, stand-alone interfaces are provided at certain locations, which can be optimized for their respective purposes of use. For example, the interfaces between the data center and the administration area may be wired internet interfaces which are available by virtue of the infrastructure that is already present in each case. Moreover, multiple uses of the administration area may be made possible, for example a personal computer (PC) with internet access or web access may be provided for the members of the training team and/or for the participants. At least one interface of the network access point, in particular to the internet (www), may be implemented as a mobile network interface via Global System for Mobile Communications (GMS), Universal Mobile Telecommunications System (UMTS) or Long Term Evolution (LTE). By providing an at least in part wireless transfer, a reliable data link, in particular to the central computer, may be established, wherein the network access point is not tied to any existing other infrastructure conditions, in particular, not tied to any stationary network cable connections, but availability is provided due to the general network coverage of mobile radio networks to a large degree.

In particular, a performant interface having a relatively short reach compared to a mobile radio interface, for example a WLAN interface, may be used between the network access point and the computer located in the motor vehicle. The connection thus provided may allow a unidirectional data transfer from the network access point to the motor vehicle or a bidirectional data transfer.

The invention can be used particularly advantageously if the training participants carry with them for their identification an electronic element that can be at least read in a contactless manner and includes a participant identification, for example a so-called Radio Frequency Identification (RFID) element, in which a unique RFID identification that can be read in a contactless manner and can be uniquely associated with the element, is electronically stored. The RFID identification can then be read out of the RFID element using a reading element in the course of the recording of the participant data, can be transferred into the administration computer, can be associated with the participant data and can, coupled therewith, be stored in the administration computer and/or in the central computer for example in a database. If a training participant also carries the RFID element with him/her, for example on his/her wrist, during the driver training, in particular whilst driving the motor vehicle, then this element can be read electronically at specified locations and/or at specified times, and the participant can be automatically identified by means of the read RFID identification. For example, an RFID reading device may be provided in the motor vehicle, by means of which the participant is automatically identified. By means of the data identified there, participant-specific outputs may then automatically be carried out on the vehicle, for example his/her name can be displayed on a display device and/or participant-specific vehicle settings such as seat adjustment, mirror adjustment etc. can be automatically carried out. To this end, it may in particular be provided for the RFID identification data coupled to the participant data to be transferred from the central computer via the respective interfaces into the computer located on the motor vehicle. To this end, it may further be provided for participant-specific vehicle adjustment data to be stored for example in the motor vehicle and/or in the central computer and for the vehicle adjustment data to be retrievable upon identification or selection of a participant in a certain motor vehicle, in order to carry out a participant-specific vehicle adjustment. Thus, also measurement data can be associated with the respectively identified or selected participant. Any training results achieved by the participant whilst driving the motor vehicle can be transferred as measurement data via the respective interfaces, in particular via the third network interface, from the computer located in the motor vehicle and/or from the network access point to the central computer. The measurement data can be recorded using at least one sensor that is connected to the network access point, is part of the motor vehicle and/or is connected to the computer located in the motor vehicle.

Any read or selected participant and/or participant identification data may be temporarily stored in the motor vehicle via a network data interface on the vehicle side and the network access point in the training area and/or may be transferred to the central computer, where participant-specific training data such as e.g. the name of the participant or the RFID identification, exercise data such as the name of a current training exercise and any exercise instructions as well as measurement data such as a lap time may be collected or provided and may be transferred back to the motor vehicle via the network access point. From the motor vehicle, any participant and/or vehicle-specific data or any data recorded in the vehicle, e.g. with regard to a speed, yaw rate or acceleration reached by the participant using the vehicle, can be transferred to the central computer via a network data interface on the vehicle side and the network access point.

In an advantageous embodiment of the invention, the computer in the motor vehicle is equipped with a network link. It may be directly connected to an RFID reading device provided in the motor vehicle. It may include a plurality of network interfaces, wherein at least one network interface is implemented in a wireless manner and/or one network interface is wired. In particular, the wired network interface can be used to establish a connection to an on-board network of the motor vehicle, via which a direct or indirect connection to one or more control devices for the operation of the motor vehicle may be established.

In a preferred embodiment of the invention, training data, in particular participant data, is transferred via the network access point and the computer located in the motor vehicle to a display unit of the motor vehicle and is displayed thereon. The display unit may be part of the vehicle's own graphic user interface.

In a further, preferred embodiment of the invention, an instructor computer is provided that comprises a network interface, via which it can directly or indirectly be connected to the computer located in the motor vehicle, to the network access point, to the administration computer and/or to the central computer.

From the instructor computer or from an application program running on this computer, it is possible to act, via the computer located in the motor vehicle and the on-board network of the motor vehicle, upon the control system influencing the driving operation of the motor vehicle, for example for actuating the accelerator or the brake or for switching on or off drive stability facilities of the motor vehicle, such as Dynamic Stability Control (DSC) or Dynamic Traction Control (DTC). Depending on demand, any influence by the participant as the vehicle driver on these vehicle control variables may be prevented. It may for example be provided that the driver is unable to carry out any switchover, i.e. an activation or deactivation of the DSC.

To this end, an application computer program, a so-called app, may be provided and executed in particular on the instructor computer, via which the instructor can carry out the adjustments on the motor vehicle via a user interface of the instructor computer. In this app, measurement data of the motor vehicle such as for example the speed, yaw rate or steer angle thereof, can also be displayed.

The network access point provided in the training area may in particular comprise a computer as well as one or more centers for recording at least one driving parameter of the motor vehicle and in particular measurement data.

Further embodiment examples of the invention will be explained in more detail below by means of the figures, wherein:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
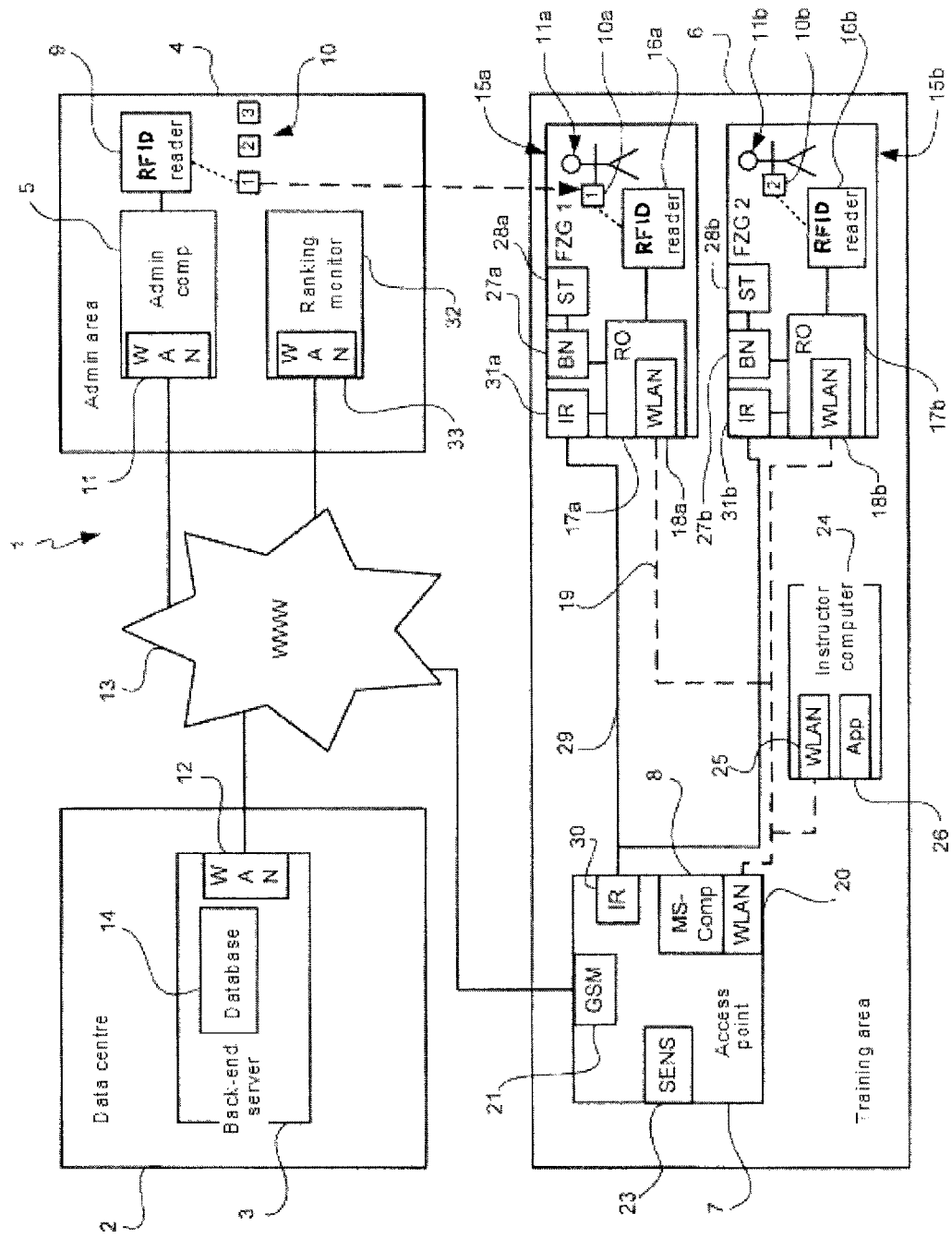
FIG. 1 shows a data processing system.

The data processing system 1 shown in FIG. 1, which is spatially distributed over various areas and is networked for recording and processing training data of one or more driver training sessions for motor vehicles, comprises a central back-end computer 3 provided in a data center 2, an administration computer 5 provided in an administration area 4 and a plurality of computers provided in a training area 6, in particular a measurement system computer 8 provided in a measurement and transfer station of a network access point 7. The data center 2 is here located in a first building, the administration area 4 is in particular located in a second building that is spatially and physically separate from the first building. The training area 6 is in particular located in the open and comprises a training surface over which motor vehicles can drive.

Data of the participants of the driver training, such as their names, ages etc., are recorded in the administration area 4 by means of the administration computer 5 as participant data. An RFID reading device 9 is connected to the administration computer 5, by means of which in each case identification data that can be uniquely associated can be read in a contactless manner by RFID chips 10. In the course of this, each participant is associated with an RFID chip 10 that is handed out to them, for example on a wristband 10a or 10b, which is worn by the participant 11a or 11b for the duration of the driver training. The participant data including the RFID identification data associated in each case with the participants 11a, 11b is coupled and transferred, via Wide Area Network (WAN) interfaces 11, 12 and the internet connection 13, to the back-end computer 3 which stores this coupled data in a database 14. The coupled data may also temporarily or permanently be stored in the administration computer 5.

Once the registration formalities in the administration area 4 for the participants 11a or 11b are completed and they have received first instructions and briefings for the procedure of the driver training, they can go into the training area 6 and can get into the motor vehicles 15a and 15b, in which they are to receive their driver training. In the motor vehicles 15a and 15b, RFID reading devices 16a and 16b are again provided which read in each case the stored identification data from the RFID chips 10 on the wristbands 10a, 10b of the participants 11a and 11b, respectively, in order to identify the participants 11a, 11b. To this end, on-board vehicle computers 17a, 17b are used to establish a connection via the WLAN (Wireless Local Area Network) network interfaces 18a, 18b thereof to the back-end computer 3 via the network access point 7 and its GSM interface 21, the internet 13 and the WAN interface 12. Temporary storage is provided both in the computer 17a, 17b provided in the motor vehicle and/or in the measurement computer 8. The WLAN connection 19, which is substantially limited to the training area 6, is used to connect the corresponding WLAN network interface 20 of the measurement system computer 8 of the network access point 7 with the WLAN network interfaces 18a, 18b of the motor vehicles 15a, 15b and with the network interface 25 of the instructor computer. In addition, the access point 7 has a Global System for Mobile Communications (GSM) mobile radio module 21, via which it can locally independently establish a connection via the internet 13 and the WAN connection 12 of the back-end server 3 accommodated in the data center 2. The participant data for the training is synchronized in the access point 7 and is also transferred to the respective motor vehicle 15a, 15b. Thus, the respective driver can be identified at any time even without a permanent communication. The RFID identification data transferred in this way can be used in the back-end server 3 in order to identify the respectively associated participant by means of the data stored in the database 14. The participant data automatically identified in this way can be transferred to the respective vehicle 15a, 15b over the same transfer path in the opposite direction and the respective participant 11a, 11b can for example be individually welcomed by name in a user interface, for example in a vehicle display. Moreover, participant-specific vehicle adjustment data, such as for example data stored from an earlier training session or an earlier exercise about a seat adjustment or for adjusting electric outside mirrors, can be downloaded from the back-end server 3 or can be read from a storage device in the motor vehicle 15a, 15b, and corresponding adjustments can automatically be made via the on-board network 27a, 27b and the respective control devices 28a, 28b.

During ongoing driver training, whilst vehicles 15a, 15b are being controlled by the participants 11a, 11b, the measurement computer 8 and the sensors 23 connected thereto, such as for example photoelectric barriers, timers etc., training values of the participants are recorded as measurement data. These values can be stored in the measurement system computer 8, can be further processed therein and/or can be transferred to the vehicles 15a, 15b via the WLAN network 19, can be transferred to the instructor computer 24 via the WLAN interface 25 thereof and/or can be transferred to the back-end server 3 via the GSM interface 21 and the internet 13. For identifying a motor vehicle 15a, 15b during a training session, in particular whilst passing a sensor 23, unidirectional or bidirectional communication between the network access point 7 and the motor vehicle 15a, 15b can be carried out via an infrared (IR) link 29 or via the infrared interfaces 30, 31a, 31b respectively establishing the latter. For example, the motor vehicle 15a, 15b can transfer vehicle identification to the network access point 7. The vehicle identification may be linked in a suitable manner, for example in the vehicle, with the respective participant data of the participant currently driving the motor vehicle 15a, 15b, and the link may be stored within the data network, in particular further linked with time stamp data.

The instructor computer 24 is typically operated by the trainer of the driver training. It is implemented as a mobile computer such as e.g. a laptop, a tablet PC, a smartphone or the like. For displaying, evaluating etc. the training data, an application computer program, a so-called app 26, runs on the instructor computer 24. The app 26 can also be used to carry out control functions for transferring data between the instructor computer 24, the network access point 7, the back-end server 3 and in particular the computers 17a, 17b located in the vehicles 15a, 15b. These computers 17a, 17b are in turn directly connected to the vehicle-internal control components such as an on-board network 27a, 27b and control devices 28a, 28b connected thereto and/or vehicle-internal sensors such as for example a tachometer. The app 26 can be used to drive such control components in a targeted manner and/or to read out sensor values. The on-board network 27a, 27b may contain network elements typical to motor vehicles, such as e.g. components of a Controller Area Network (CAN) bus, a Local Interconnect Network (LIN) bus, a Flexray bus or a Media Oriented Systems Transport (MOST) bus or of an Ethernet network.

Data on training performance results achieved by the respective participants 11a, 11b etc., for example data recorded by the sensors, is transferred to the back-end server 3 and can be transferred to a monitor 32 via the internet connection 13, on which monitor for example also a so-called participant performance ranking may be displayed.

Figure 2:
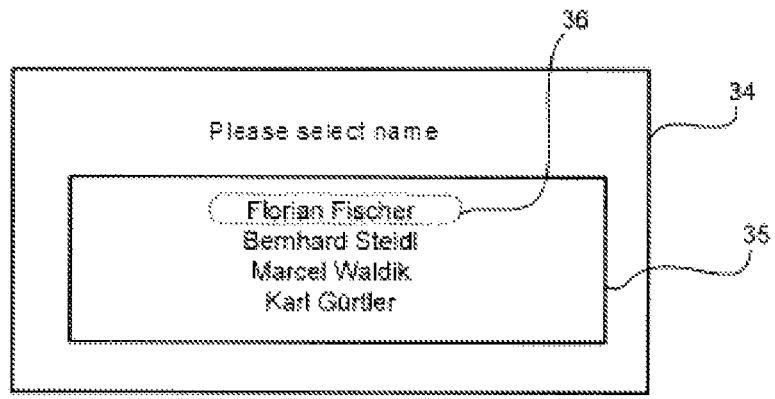
FIG. 2 shows a first display in a graphic user interface in a vehicle.

FIG. 2 shows a display 34 provided in a motor vehicle, on which a participants list 35 of training participants in a driver training can be displayed for selection. Such a display and selection is advantageous above all when the motor vehicle is not equipped with an RFID reader, so that a fully automatic identification of a participant operating the motor vehicle is not possible. To this end, participant data is downloaded from the database 14 in the back-end server 3 via the data paths described above into the motor vehicle and the participant data is displayed as a list 35. The participant can then in each case select his/her name via a selection marker 36 by means of a suitable selection means such as a scroll wheel or a touch-sensitive display and can in particular make a selection from the list in a manner supported by the computer. The selected data can then, together with identification data of the motor vehicle, be fed back to the network access point 7 and/or to the back-end server 3. The display 34 may be a display device integrated in the motor vehicle, which is also used for other display purposes, for example for displaying information of a navigation system or for displaying on-board computer values. To this end, it might be directly or indirectly connected to the on-board network of the motor vehicle. Once a participant has been selected, participant-specific vehicle adjustments, such as for example a seat adjustment or the adjustment of electrical outside mirrors, can automatically be made via the on-board network 27a, 27b and the respective control devices 28a, 28b from adjustment data downloaded from the back-end server 3 or read out from a memory in the motor vehicle 15a, 15b.

Figure 3:
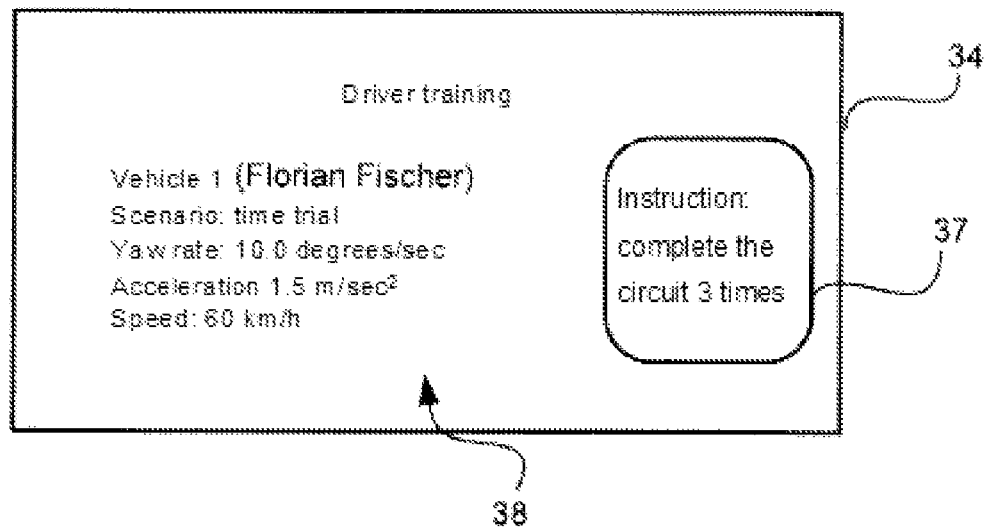
FIG. 3 shows a second display in a graphic user interface in a vehicle.

FIG. 3 shows how two further indications are made on the display 34, namely instructions for the training participant with regard to a specific training exercise to be carried out using the motor vehicle in a window 37, and values currently recorded by various sensors as well as the identification of the vehicle (vehicle 1) and the association of the participant name in an area 38. The instructions shown in the window 37 can then be automatically detected or can be manually allocated by the instructor in particular over his/her computer 24.

Figure 4:
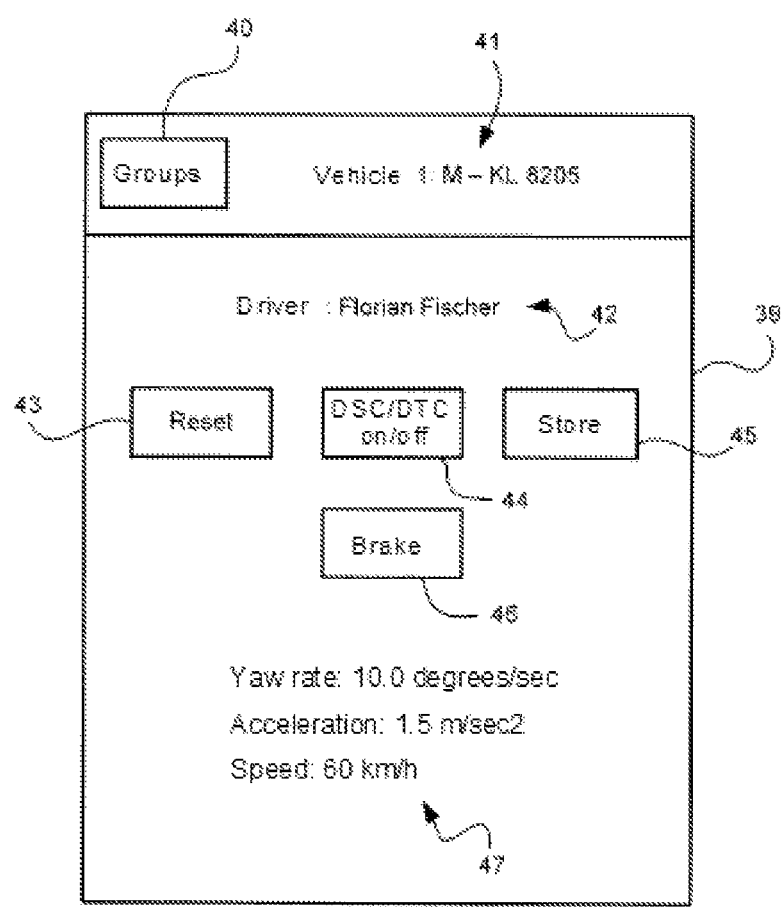
FIG. 4 shows a display in a graphic user interface of an instructor computer.

FIG. 4 shows a user interface 39 of the instructor computer 24. Via the group button 40, the trainer (instructor) can display data relating to the participant groups. In the area 41, identification data of the training motor vehicle currently monitored by him/her is shown, e.g. of the motor vehicle 15a. In the area 42, the name of the training participant currently operating this motor vehicle is indicated for identification. The reset button 43 can be used by the instructor to reset training-specific measurement data, in particular lap times and speeds at certain points by pressing a button. The DSC/DTC button 44 can be used by the instructor to turn driving stability programs of the motor vehicle 15a, 15 on or off, in particular the Dynamic Stability Control (DSC) or the Dynamic Traction Control (DTC). The brake button 46 can be used by the instructor in a targeted manner to act upon the brake system of the motor vehicle 15a, 15b in order to decelerate it. In the area 47, any measurement data currently recorded in the motor vehicle 15a, 15b and/or using sensors 23 of the network access point 7 are shown.

In the embodiment example described, the network access point 7 comprises both data transfer elements and sensors and a computer. However, the network access point 7 does not necessarily have to include all of these elements, but may for example be limited to the data transfer elements such as the interfaces for the WLAN 20 and for a wireless transmission 21.

The described devices and system components are in particular controlled using computer programs and may to this end have further elements, per se known, of computers and digital control units such as a microprocessor, volatile and non-volatile memories, interfaces etc. Therefore, the invention may be realized wholly or partially in the form of a computer program product which fully or partially causes an operation according to the invention upon loading and executing on a computer to be carried out. For example, it may be provided in the form of a data medium such as a CD/DVD or in a control device, but also in the form of one or more files on a server, from which the computer program can be downloaded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for performing a driver training for drivers of motor vehicles, comprising:
   a central computer provided in a data center and having a first network data interface;
   an administration computer provided in an administration area and having a second network data interface,
   wherein the central computer and the administration computer are configured to communicate with each other via the first and second network data interfaces, and
   wherein, in the administration computer, participant data corresponding to participants of the driver training is recorded and coupled with participant identification data in a participant identification system, wherein the participant data and coupled participant identification data are transferable to the central computer, wherein a device located in a motor vehicle is configured to be used for at least one of automatically identifying a driver of the motor vehicle as a participant of the driver training using the participant identification data associated with the participant, and selecting the participant from a list containing at least a portion of the participant data;

a network access point provided in a training area in which the motor vehicle is driven by the participant, said network access point having a third network data interface via which a wireless data transfer of at least some of the participant data can be carried out between the central computer and the network access point, wherein the network access point is further configured with a data transfer interface via which at least the portion of the participant data transferred from the central computer can be further transferred into a computer located in the motor vehicle;

a computer located in the motor vehicle connected to an on-board network of the motor vehicle and configured to communicate via the on-board network with a plurality of control devices of the motor vehicle; and an instructor computer configured to be connected to the computer located in the motor vehicle, via the network access point, wherein an application computer program executing on the instructor computer is configured to act upon at least one of the plurality of control devices, during the driver training and via the computer located in the motor vehicle and the on-board network of the motor vehicle, by causing or preventing at least one of an actuation of an accelerator of the motor vehicle, an actuation of a brake of the motor vehicle, switching on a drive stability facility of the motor vehicle, and switching off the drive stability facility of the motor vehicle.

2. The system as claimed in claim 1, comprising at least one RFID reading device, by which the participant data associated with the participant identification data can be read from an RFID arrangement in a contactless manner.

3. The system as claimed in claim 1, wherein the network access point located in the training area has a mobile network interface, via which a connection with the central computer can be established.

4. The system as claimed in claim 1, wherein the computer located in the motor vehicle has a corresponding data transfer interface via which the data transfer interface of the network access point communicates with the computer located in the motor vehicle in a wireless manner.

5. The system as claimed in claim 1, wherein the device comprises a display unit that is configured to be used for said selecting the participant from the list containing at least the portion of the participant data.

6. The system as claimed in claim 1, in which participant-specific vehicle adjustment data is stored in at least one of the motor vehicle and the central computer, wherein the participant-specific vehicle adjustment data can be retrieved upon identification or selection of a corresponding participant in a given motor vehicle, in order to carry out participant-specific adjustments in the motor vehicle.

7. The system as claimed in claim 1, wherein the network access point provided in the training area comprises at least one sensor for recording at least one driving parameter of the motor vehicle during a training trip.

8. A method for performing a driver training for drivers of motor vehicles using a system comprising a central computer provided in a data center and having a first network data interface, an administration computer provided in an administration area with a second network data interface, a computer located in a motor vehicle connected to an on-board network of the motor vehicle and configured to communicate via the on-board network with a plurality of control devices of the motor vehicle, and an instructor computer configured to connect to the computer located in the motor, wherein the method comprises the acts of:

communicating, by the central computer and the administration computer, with each other via the first and second network data interfaces;

recording, in the administration computer, participant data relating to participants of the driver training, wherein the participant data is coupled with participant identification data in a participant identification system;

transferring the participant data and coupled participant identification data to the central computer;

performing at least one of an identifying and selecting operation, wherein the identifying operation comprises identifying a driver of the motor vehicle as a participant of the driver training using the participant identification data associated with the participant, and wherein the selecting operation comprises selecting the participant from a list containing at least a portion of the participant data, and wherein the motor vehicle is driven by the participant in a training area, and the following data transfer operations are carried out by a network access point provided in the training area:

transferring, via a third network data interface provided in the network access point, the portion of the participant data between the central computer and the network access point at least in part in a wireless manner;

transferring, via at least one data transfer interface provided in the network access point, the portion of the participant data that was transferred by the central computer into a computer located in the motor vehicle; and acting upon at least one of the plurality of control devices, during the driver training and by the instructor computer via the computer located in the motor vehicle and the on-board network of the motor vehicle, to cause or prevent at least one of an actuation of an accelerator of the motor vehicle, an actuation of a brake of the motor vehicle, switching on a drive stability facility of the motor vehicle, and switching off the drive stability facility.

9. The method as claimed in claim 8, wherein the participant has a uniquely identifiable RFID assembly in which the participant data of the participant identification system is stored, and is read out using an RFID reading device provided in the motor vehicle, and further participant data is displayed in the motor vehicle using the participant data read out using the RFID reading device.

10. The system as claimed in claim 5, wherein the participant data can be transferred via the network access point and the computer located in the motor vehicle from the central computer to the display unit of the motor vehicle.

11. The system as claimed in claim 1, wherein the device comprises an RFID reading device that is configured to be used for said identifying the driver of the motor vehicle as the participant of the driver training using the participant identification data associated with the participant.

* * * * *